Jan. 13, 1925.

T. W. MAY 1,522,530

BUSINESS FORM

Filed July 31, 1922

Inventor

Theodore Walter May

By Brockett & Hyde

Attorneys

Patented Jan. 13, 1925.

1,522,530

UNITED STATES PATENT OFFICE.

THEODORE WALTER MAY, OF CHICAGO, ILLINOIS.

BUSINESS FORM.

Application filed July 31, 1922. Serial No. 578,698.

*To all whom it may concern:*

Be it known that I, THEODORE WALTER MAY, a citizen of the United States, residing at Chicago, in the county of Cook and State of Illinois, have invented certain new and useful Improvements in Business Forms, of which the following is a specification.

This invention relates to an improved business form adapted especially for use in connection with life insurance.

The object of this invention is to provide an improved business form comprising an authorization section, an acceptance section and coupon sections so arranged as to facilitate the authorization of a given amount of insurance by the company, and the acceptance of the same by the insured, the amount of insurance accepted being conveniently indicated by the coupon sections adjoining each of the other two sections.

The figure of the drawing illustrates my improved business form.

According to the old practice, the local insurance agent would secure from the insurance company a policy for additional insurance upon the life of a policy-holder for the purpose of soliciting and obtaining from such policy-holder insurance to the same extent as already held by the insured. This practice, however, proved more or less awkward and expensive because of the fact that in so many cases the policy-holder desired certain changes in his new policy, as for instance with respect to the exact amount of insurance, the name of the beneficiary, the manner of payment or the form of policy. The business form as disclosed in the present application avoids the expense and delay incident to this old practice.

According to the present invention, the company authorizes the local agent to sell a given policy-holder named in the authorization section insurance up to a certain amount and in any one of several different forms of policies under certain conditions named in the authorization section. With this authorization, the local agent is then prepared to offer to the policy-holder any amount of insurance in any form within the limits authorized by the company. The policy-holder will then, according to the present invention, indicate upon what is termed the acceptance section the exact amount of insurance desired, the form of policy, the style of payment and the name of the beneficiary, together with other necessary data. The authorization section is retained by the policy-holder while the acceptance section is returned to the company for the preparation of a policy along the lines indicated in the acceptance section.

I have accordingly devised a convenient business form along the lines above indicated, this form comprising upper and lower halves which can be severed along a scored or weakened line. The upper half comprises the authorization section and a coupon section adjoining the same to one side thereof; while the lower half comprises the acceptance section and a duplicate coupon section arranged to the one side thereof and directly beneath the first coupon section. The authorization and acceptance sections are identified by the same contract number. The duplicate coupon sections bear also the same contract number so as to be identified with the authorization and acceptance sections, the several amounts indicated upon the coupon sections being separated by scored or weakened lines so as to facilitate the indication of the amount of insurance authorized and accepted by the simple process of severing the coupon sections along the line just above or beyond the particular amount of insurance.

The insurance company will indicate, upon the coupon section referred to by reference numeral 1, the maximum amount of insurance which may be placed upon the life of the policy-holder named in the authorization section 2. The name of the agent will also be indicated as well as the date within which the contract must be signed. The acceptance section indicated by reference numeral 3 will then be filled in so as to indicate the form of policy desired by the policy-holder as well as the name of the beneficiary and the amount of premium. This section indicates also the date within which said acceptance must be made as well as the style of payment desired. Should the policy-holder accept the full amount authorized, it is necessary merely to sever the two halves of the form, but should he desire a less amount than that authorized, the coupon section should be torn along the proper line so as to provide a record or check upon the authorization and acceptance sections as to the amount of insurance actually accepted. The highest amount thereon indicated will then correspond to the amount of insurance actually accepted by the policyholder. For instance, should the policyholder accept $15,000.00 insurance, the coupon sections will be torn along the scored line 4 between the amounts of $15,000.00 and $17,500.00.

With the present form, the tearing operation is simplified because of the fact that the two halves of the form can be folded together with the printed matter on the outside thereof and the two coupon sections torn along the proper line by a single operation. The upper and lower halves are then severed along the middle scored line 5; whereupon the authorization section 2 with its coupon section 1 is retained by the policyholder and the acceptance section 3 with its coupon section 6 is forwarded to the insurance company for the preparation of a new policy according to the terms therein indicated.

What I claim is:—

In a life insurance form, a sheet comprising an authorization section bearing a blank form for indicating the amount and conditions of insurance authorized by the insurance company, an acceptance section bearing a blank form of acceptance by the insured of the offer indicated in said authorization section, and duplicate coupon sections for said authorization and acceptance sections, said authorization and acceptance sections being arranged one above the other and bearing like indicia so as to identify them as pertaining to the same contract, said coupon sections being arranged to one side of said authorization and acceptance sections and one above the other with indications of amounts of dollars on said coupons, and severing lines between said several sections and also between the coupons of the coupon sections.

In testimony whereof I hereby affix my signature.

THEODORE WALTER MAY.